July 31, 1956 A. N. KING ET AL 2,757,368

SYSTEM AND APPARATUS FOR CONTROL OF ELECTRICAL CIRCUITS

Filed Nov. 25, 1952

2 Sheets-Sheet 1

INVENTOR.
ARTHUR N. KING
BY ALLEN C. WOOLDRIDGE
J. B. Felshin
ATTORNEY

July 31, 1956 A. N. KING ET AL 2,757,368

SYSTEM AND APPARATUS FOR CONTROL OF ELECTRICAL CIRCUITS

Filed Nov. 25, 1952 2 Sheets-Sheet 2

INVENTOR.
ARTHUR N. KING
BY ALLEN C. WOOLDRIDGE

J. B. Felshin
ATTORNEY 2,757,368

Patented July 31, 1956

2,757,368

SYSTEM AND APPARATUS FOR CONTROL OF ELECTRICAL CIRCUITS

Arthur N. King, Glen Cove, N. Y., and Allen C. Wooldridge, South Orange, N. J., assignors to Broadway Maintenance Corporation, Long Island City, N. Y., a corporation of New York Application November 25, 1952, Serial No. 322,396

7 Claims. (Cl. 343—225)

This invention relates to a system and apparatus for control of electrical circuits by a radio frequency signal. One practical application of the invention is for the control of street lighting systems.

An object of this invention is to provide a system and apparatus of the character described which shall comprise an electronic switch at each desired control point and one master control at the energizing source. In accordance with the present invention, no special transmitting equipment for the control of the switches is required. The transmitter for the radio frequency signal may constitute an established radio broadcasting station. The electronic switch shall consist of the antenna, radio circuit, and a switching assembly. The antenna and radio circuit shall be pre-tuned to receive signals only from the transmitting station. The radio circuit may be designed as a high gain radio frequency receiver, pre-tuned to exclude all signals and noise except for the carrier frequency of the control station. Output of the receiver should be of sufficient amplitude to energize the primary stage of the switching assembly. The arrangement is such that interruptions of the control station carrier deenergizes the primary stage of the switching assembly and energizes the secondary stage. In accordance with the invention, the final stage of the switching assembly is not energized unless the control station signal is interrupted a required number of times within a limited period. Thus, accidental single interruptions or multiple interruptions over an extended period are not capable of operating the switching assembly. In accordance with the invention, therefore, the second state of the switching assembly automatically resets to a non-operating operation unless the required number of operations occur in the required interval.

The apparatus may be designed to provide two separate switching functions, such as one "on" and one "off," one predetermined number of interruptions being required for "on" function and another predetermined number of interruptions being required for the "off" function. The switching assembly may comprise a ladder type relay or stepping relay. Use of the electronic switch embodying the invention provides for simultaneously switching at each control point operating at precisely the same instant as at all others.

The electronic switch embodying the invention requires no expensive or extensive control point installation, using existing broadcasting equipment and the interrupted signal principle resulting in virtually tamper proof operation and lowest initial cost.

The radio circuit may be assembled in a disposable capsule, if desired, fitted with prong type base for easy replacement. A plugged in radio circuit may be separately mounted or installed on a base common to the switching assembly.

The electronic switch is preferably designed for operation from any radio frequency signal in the standard broadcasting band having suitable area coverage. The energizing equipment may consist of a time device, keying device, and a relay for installation in the plate circuit of the station transmitter. The timer device may be a standard astronomical clock, a photoelectric relay, or any device which will control a low power electric circuit at the prescribed times. The keying device, if desired, may be a standard electric sign flasher or any similar device for interrupting a low power electrical circuit a prescribed number of times within a limited interval.

Now, it will be understood that the present system is tamper proof. If the electric circuits were controlled by a positive signal instead of by the interruption of a signal, the signal could be duplicated. Many ways have been found to imitate almost any radio signal. In accordance with the present system, the street lights are operated on a negative operation. Even if someone were to operate a transmitter similar to the transmitting station used for the present invention, and were to interrupt the signal in the same pattern, it would not operate the lights because the first station is still operating and sending out a signal which would prevent operation of the switching assembly. The present system is the only system to turn lights "on" or "off" instantaneously and simultaneously. Other systems are mechanical and subject to construction variances. With time clocks, you do not have wilful control. If you have a very dark day or an air raid, by using a clock, you cannot vary the time when the lights go "on" or "off." With the present system, even if the signals are interrupted with the use of an astronomical clock, an operator may separately interrupt the transmitted signal at will when occasion demands the same. With street light control systems using photoelectric switches, difficulty is encountered because the operation must correspond to the light level at the control point. These vary with the age, manufacture, and characteristics of the photoelectric switches. Furthermore, you get variations because of ambient lighting at the control place so that there is no positive and wilful control. The only other wilfully controlled system for controlling street lights is by wire control. The switching impulses are sent over the power wires which go to each lamp post. Such a system requires multiple controls for each isolated supply network as well as expensive control equipment.

With the present system reliance is had on a signal from an established broadcasting station and the control equipment at the station is very inexpensive. The transmitted signal can be operated manually or under the control of a clock such as an astronomical clock. At every broadcasting station, there is a test key. This key only has to be pressed in a certain pattern to duplicate the required pattern. There is no objection to the interruption of the broadcasting because the "off the air" interval is of such short duration as not to affect the operation of the station.

The present system is dependable and economical and may be so constructed as to present distinct advantages in servicing. Thus, the whole radio circuit, because of its simplified nature, may be assembled in a disposable, prong mounted capsule. The radio circuit is so dependable that it may not pay to service the same in case it goes wrong. The radio circuit may just be taken out and scrapped, if it is more economical to merely plug in a new radio circuit. The switching assembly may also be hermetically sealed within a disposable capsule. Thus the present system reduces the cost of maintenance and provides for the replaceable unit method of testing for trouble, and also makes it possible to change the operating radio frequency by replacing or changing the radio circuit capsule.

Other objects of the present invention will become apparent upon reading the following specification and referring to the accompanying drawings, which form a material part of this disclosure.

The invention accordingly consists in the method steps, the features of construction, combinations of elements, and arrangements of parts, which will be exemplified in the construction hereinafter described, and of which the scope will be indicated by the appended claims.

Figure 1:
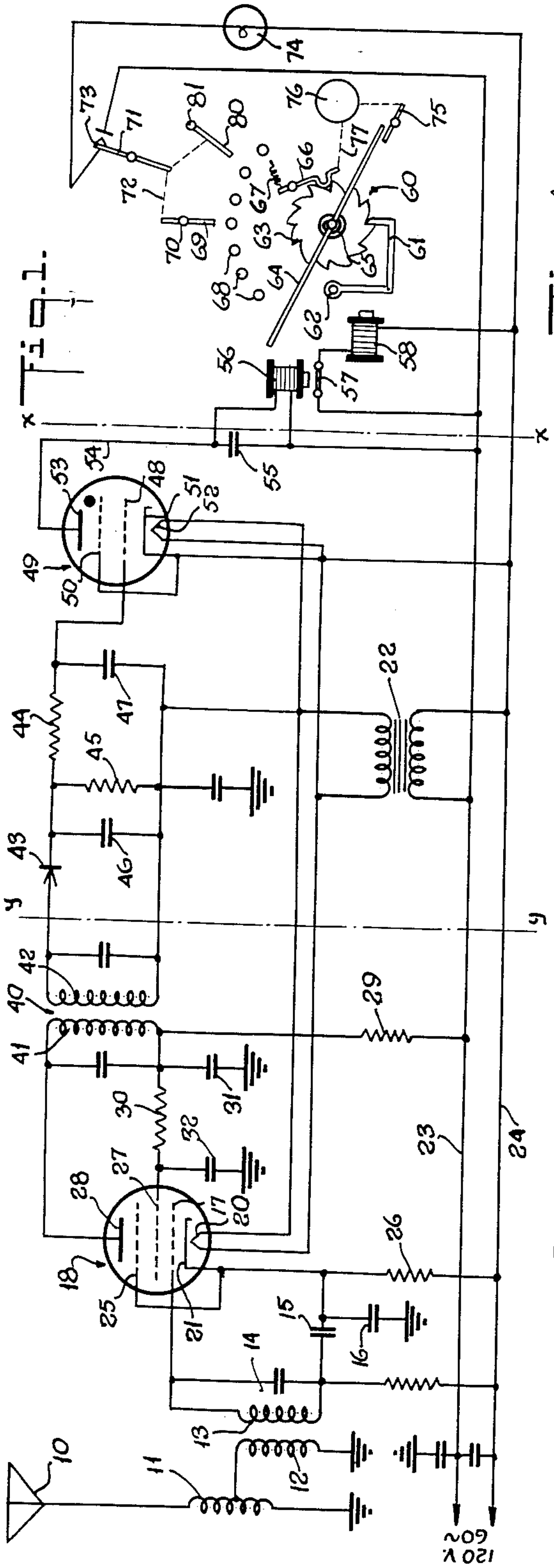
Fig. 1 is a schematic representation of the radio receiver and switching assembly of the present invention.

Referring now more particularly to the drawings, 10 designates an antenna which may be of the whip type or other suitable construction. The antenna includes a tuning coil 11 which is tapped at a suitable point by the primary coil 12 of the air transformer 13. In the secondary of the transformer 13 is a R. F. tuned tank circuit 14. The tank circuit 14 is pre-tuned to the carrier frequency of a particular radio station, for a purpose to be described hereinafter.

The condensers 15 and 16 are of such value as to bypass all radio frequencies to ground.

The carrier frequency voltage is applied to the grid 17 of amplifier tube 18. While the amplifier tube is shown for the purpose of illustration as a pentode, it is appreciated that any suitable high gain amplifier may be used. It is seen that the heating filament 20 for the cathode 21 of the amplifier 18 is coupled by a transformer 22 to the power lines 23 and 24. The cathode 21 is connected directly to the suppressor grid 25 and both are biased by resistor 26. The screen grid 27 is in circuit with the amplifier plate 28, and the resistors 29 and 30 and capacitors 31 and 32 are selected to provide the desired screen grid voltage and bypass the A. C. component.

Also in the plate circuit of amplifier 18 is a coupling transformer 40 having its primary 41 and secondary 42 both tuned to the desired carrier frequency.

Figure 2:
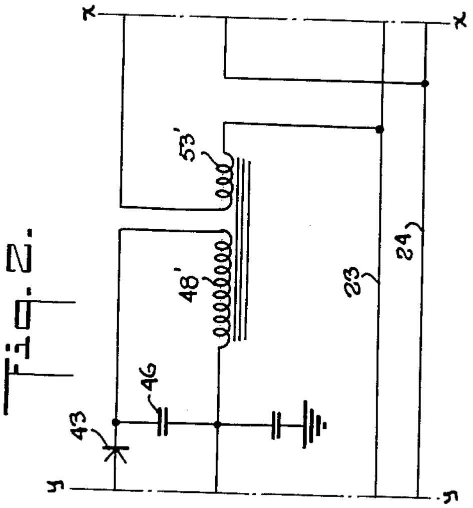
Fig. 2 is a schematic representation of a slightly modified form of power amplifier for use in the receiver of Fig. 1.

In the output of coupling transformer 40 are a germanium or other suitable rectifier 43, resistors 44 and 45, and condensers 46 and 47, which combine to filter and smooth the transformer output. Thus, a fairly constant direct current is applied to the grid 48 of amplifier 49. While amplifier 49 is shown for purposes of illustration as a gas filled tube or thyratron, it is appreciated that other suitable amplifiers may be used, such as the magnetic amplifier circuit shown in Fig. 2 wherein a saturable reactor, having a control winding 48' and an output winding 53', is substituted for the amplifier circuit of thyratron 49. In the thyratron as illustrated, there is provided a shield 50 connected directly to the cathode 51, both being connected to the power line 24. The cathode filament 52 is heated in a manner similar to the cathode filament 20 of amplifier 18. The plate 53 of amplifier 49 is connected by path 54 to the power line 23. In the path 54 is a condenser 55.

Thus far described, the device is completely electronic and, more particularly, is a radio receiver. It is preferred that the radio receiver be assembled in a hermetically sealed disposable capsule (not shown) and mounted for plug in connection with the power lines 23 and 24. This has been found to greatly simplify and expedite the testing and maintenance of the device.

When a signal of the proper frequency is present in the radio receiver, it is seen that a high voltage will be impressed across the condenser 55. Arranged in parallel with the condenser 55 is a relay coil 56 which is energized when there is a signal in the radio receiver. Arranged in series with respect to each other and across the power lines 23 and 24 are a normally closed switch 57 and a relay coil 58. The normally closed switch 57 is maintained in open position by the relay coil 56 when the latter is energized. When the relay coil 56 is de-energized, that it, when there is no signal in the radio receiver, the switch 57 closes and the power lines 23 and 24 energize the relay coil 58. This causes actuation of the stepping relay generally designated 60.

The stepping relay 60 includes a pawl 61 which swings about the point 62 toward the relay coil 58 when the latter is energized. This effects movement of the sprocket 63 in a clock-wise direction. The contact arm 64 is secured to the sprocket 63 and movable therewith, and a spiral spring 65 has one end fixed to the sprocket 63 and the other end secured to a fixed point to urge the sprocket and contact arm in a counterclockwise direction. In order to prevent counterclockwise rotation of the sprocket 63, a pivoted dog 66 is provided which engages the teeth of sprocket 63 and is resiliently held there-against by spring 67. When the pawl 61 is actuated five times, causing the contact arm 64 to step five position, which positions are designated by contacts 68, the contact arm will swing lever 69 counterclockwise about pivot 70. Such movement of the lever 69 will cause clockwise rotation of the lever 71, there being a direct connection between the two levers as indicated by the dotted line 72. Thus, the switch 73 will be actuated to close the power circuit and operate the load indicated at 74.

As contact arm 64 moves toward its first step position, it rotates the pivoted lever 75 which winds or actuates the clock escapement movement 76. The escapement movement runs down after a determined time interval, for example, two seconds, and thereupon retracts the dog 66 from engagement with the sprocket 63 by the connection indicated in dotted line at 77. Thus, regardless of the number of steps moved by the contact arm 64, it will return to its original position after a predetermined time interval. In order to close the switch 73, it is necessary to step the contact arm, 64, five positions during the predetermined time interval. It is seen that this pattern of actuation can only result from the absence of a signal in the radio receiver five times within the predetermined time interval. When the switch 73 has been closed, after actuation of the stepping relay in the predetermined pattern, the contact arm 64 will return to its original position at the expiration of the predetermined time interval, the dog 66 will reengage in the sprocket 63, and the lever 75 will assume its original position.

In order to open the switch 73, it is necessary to step the contact arm 64 at least seven steps to swing the lever 80 about the pivot 81 and rotate the lever 71 in a counterclockwise direction. Thus, it is seen that in order to open the switch 73, it is also necessary to actuate the stepping relay in a predetermined pattern. If the number of steps that the contact arm is moved during the predetermined time interval is insufficient, the contact arm 64 will be returned to its original position at the end of the interval.

In a manner similar to that described for the radio receiver, it is preferred to construct the switching or stepping relay assembly in a hermetically sealed disposable capsule and provide means for plug in attachment of the switching assembly with the power supply and radio receiver.

Figure 4:
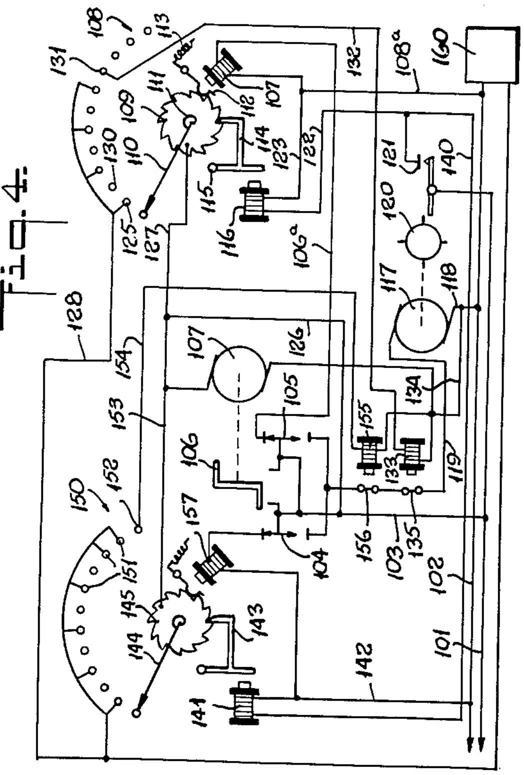
Fig. 4 is a schematic representation of an impulsing system for operation with a radio transmitter for actuating the receiver and switching assembly.

In order to effect operation of the switching assembly, it is necessary to interrupt or discontinue the transmitted radio signal according to the predetermined pattern described above. Toward this end a master impulsing system is utilized at the transmitting station. This impulsing system, as illustrated in Fig. 4, is interposed in power supply lines 101 and 102. From the power line 101, the lead 103 connects with the single pole, double throw switches 104 and 105. To actuate the switches 104 and 105 according to a predetermined schedule, dial 106 is operated by motor 107 of an astronomical dial clock (not shown). With the switch 105 in its upward position, as shown, the stepping relay generally designated 108 is in its reset position. That is, the circuit is closed through power line 101, lead 103, switch 105, wire 106a, relay coil 107, and lead 108a to line 102.

The stepping relay 108 is similar to the stepping relay 60, described above, and includes a sprocket wheel 109, a contact arm 110 rotatable with the sprocket wheel, and a spiral spring 111 urging the contact arm in counterclockwise direction. The dog 112 is urged against the teeth of sprocket wheel 109 by the spring 113, whereby counterclockwise rotation of the contact arm 110 is prevented. When the relay coil 107 is energized, as hereinbefore described, the dog 112 is retracted from engagement with the teeth of sprocket wheel 109 and the wheel will return to its original position. In order to step the stepping relay, a pawl 114 is pivoted at 115 and engages the teeth of sprocket wheel 109 so that the sprocket wheel is moved one step upon swinging movement of the pawl 114 toward the relay coil 116.

The relay coil 116 is energized by means of a pulsing motor 117 which is connected across the power supply lines 101 and 102. On one side the pulsing motor 117 is connected to supply line 102 by lead 118, and on the other side the pulsing motor is connected to supply line 101 through path 119, switch 105 and lead 103. When dial 106 trips switch 105 to its downward position, the pulsing motor 117 is across the line and drives sprocket wheel 120 in a clockwise direction. Continued clockwise rotation of the sprocket wheel 120 causes the switch 121 to repeatedly close and open. This sends regular short impulses through line 101, switch 121, wire 122, relay coil 116, wire 123, and lead 108a to supply line 102. Each of the short impulses will energize the relay coil 116 and effect stepping movement of the contact arm 110 one position.

When the contact arm 110 is stepped to its first position 125 a line circuit is closed from line 101 through lead 103, wire 126, wire 127, sprocket wheel 109, contact arm 110, contact 125, and through line path 128. It is seen that when the contact arm 110 moves to its second position 130 the line circuit is open. Similarly, every other contact closes the line circuit and the intermediate contacts open the line circuit, thereby insuring a preceptible interval between output pulses.

When the contact arm 110 has been stepped to contact 131 a different circuit across the power supply lines is closed. This circuit includes lead 103 from supply line 101, wire 126, wire 127, sprocket wheel 109, contact arm 110, contact 131, wire 132, relay coil 133, wire 134, and lead 118 connected to supply line 102. This circuit energizes relay coil 133 to attract and thereby open the normally closed switch 135 in path 119. This opens the circuit of pulsing motor 117 and stops the stepping of contact arm 110. After a predetermined time interval, dial 106 will release switch 105 to its upward position. With switch 105 in this position, the contact arm 110 will be reset to its initial position as described above, and the circuit last followed will be broken to allow switch 135 to assume its normally closed condition.

In a similar manner of operation, stepping relay 150 is operated in response to dial 106 tripping switch 104 into its downward position. This will also actuate pulsing motor 117 causing sprocket wheel 120 to rotate in a clockwise direction whereby switch 121 is repeatedly opened and closed. The closing of switch 121 will complete a circuit across the power supply including switch 121, wire 140, relay coil 141, and wire 142. As described in connection with stepping relay 108, the relay coil 141 will, upon being energized, attract pawl 143 and cause successive stepping of the contact arm 144 which is rotatable with the sprocket wheel 145.

The only structural difference between stepping relays 108 and 150 is in the number of utilized contact points. In stepping relay 108 there are five contacts utilized to close circuits, and in stepping relay 150 there are seven contacts utilized to close circuits, corresponding to the number of steps required in stepping relay 60 to turn the load on and off, respectively. When the contact arm 144 of stepping relay 150 reaches contact 152, a circuit is closed across the power supply through lead 103, wire 126, wire 153, sprocket wheel 145, contact arm 144, wire 154, relay coil 155, wire 134, and lead 118. This circuit will energize relay coil 155 to attract the normally closed switch 156 thereby opening the latter. The opening of switch 156 renders pulsing motor 117 inoperative, and after a predetermined time interval the dial 106 will effect the return of switch 104 to its upward position. This will energize relay coil 157 and reset stepping relay 150 as was described in connection with stepping relay 108. Thus, it is seen that a series of short regular pulses are produced, the number being determined by the number of contacts utilized. The pulses are transmitted from the lines 102 and 128 and are applied to a radio transmitter (not shown). Preferably, the pulses are applied to the keying relay of a conventional transmitter to render the transmitter inoperative for the pulse duration.

Figure 3:
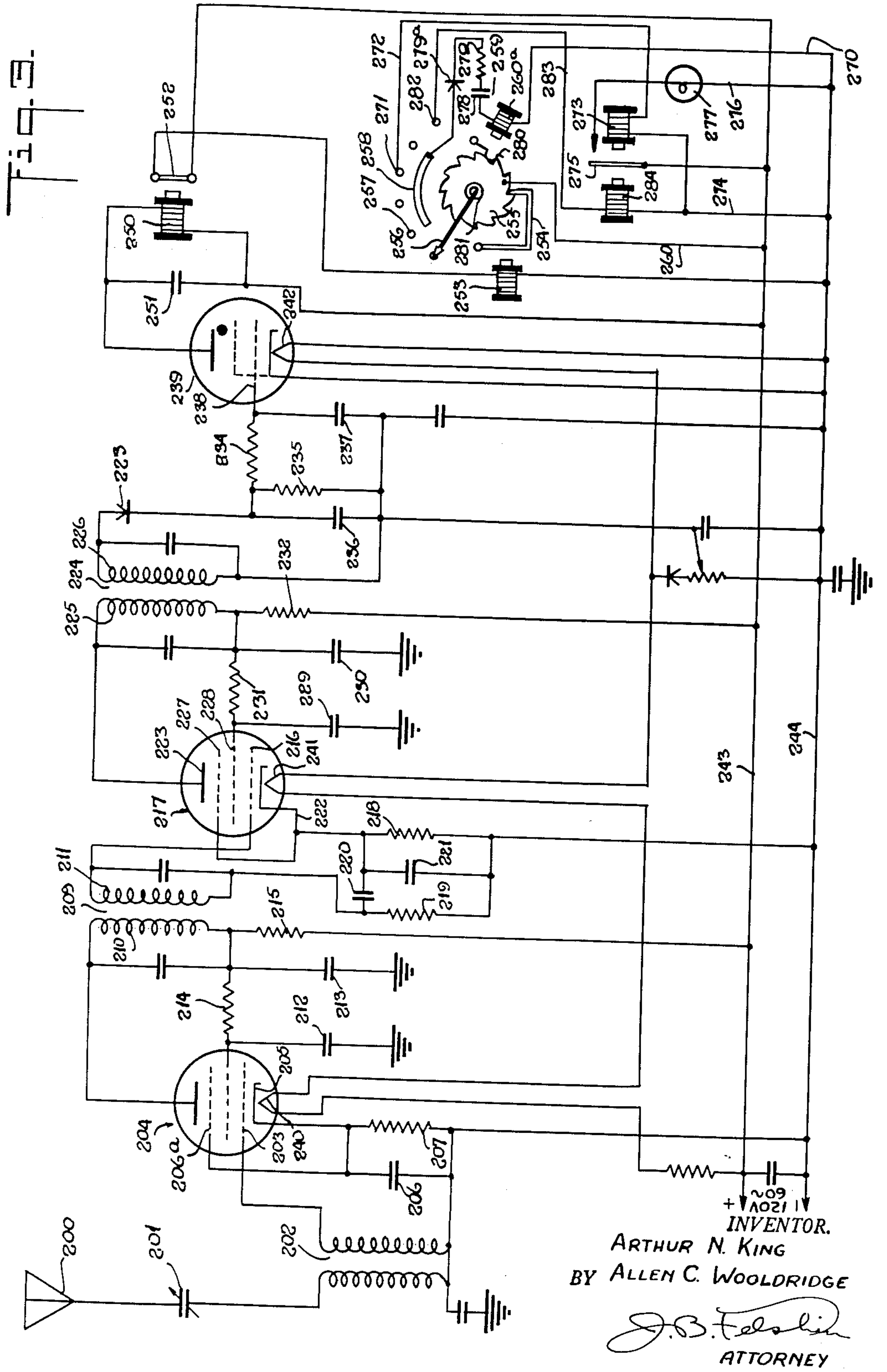
Fig. 3 is a schematic representation of a slightly modified form of receiver and switching assembly.

In a slightly modified form of the invention, see Fig. 3, an antenna 200 is provided with a trimming condenser 201 and a transformer 202 feeds the grid 203 of amplifier 204. It is seen that the transformer 202 also feeds the cathode 205 through condenser 206. The cathode 205 is directly connected to the suppressor grid 206a and is provided with a cathode bias resistor 207. Here, again, any suitable amplifier may be substituted for the pentode 204.

The plate circuit of amplifier 204 is coupled to the next amplifier stage by a transformer 209 having its primary 210 and its secondary 211 both tuned to the desired carrier frequency. The screen grid condensers 212 and 213 are selected to bypass all radio frequencies, and the resistors 214 and 215 are selected to drop the screen grid voltage to a desired value.

The output of the transformer 209 is applied to the grid 216 of the second stage amplifier 217. The second stage amplifier is provided with a cathode bias network including resistors 218 and 219, and capacitors 220 and 221, which are selected to keep the control grid voltage below the cathode voltage so that current only flows from the cathode 222 to the plate 223 when the signal voltage drives the control grid sufficiently positive with respect to the no-signal condition. In the plate circuit of amplifier 217 is a transformer 224 having both its primary 225 and its secondary 226 tuned to the desired carrier frequency. The suppressor grid 227 is connected directly to the cathode 222. As in the first stage, the screen grid 228 is provided with bypass condensers 229 and 230 and resistors 231 and 232 selected to drop the screen grid voltage a predetermined amount.

The output of the transformer 224 passes through a germanium or other suitable rectifier 223 and through the filtering network of resistors 234 and 235, and capacitors 236 and 237. Thus, the transformer output is rectified and filtered to provide a fairly smooth direct current for application to the grid 238 of thyratron 239. It will be noted that the filaments 240, 241 and 242 of amplifiers 204, 217, and 239, respectively, are arranged in series and across the power supply lines 243 and 244.

In the plate circuit of thyratron 239 is a relay coil 250, and a bypass condenser 251.

When there is current in the relay coil 250, the normally closed switch 252 is attracted and held in open position. However, when the current is interrupted, switch 252 returns to its closed position and relay coil 253 is then across the power supply and energized thereby. Relay coil 253 will then attract pawl 254 and cause rotation of the sprocket wheel 255 and the contact arm 256 which is secured to the sprocket wheel. Each time relay coil 253 is energized, the contact arm 256 will be caused to move one step. Upon moving the first step, contact arm 256 will engage contact 257 and bar 258.

This closes the circuit through lead 260, sprocket wheel 255, and contact arm 256, bar 258, time delay circuit 259, relay coil 260*a* and lead 270. Upon further actuation of pawl 254, contact arm 256 will move to its third position engaging contact 271. This closes a circuit through lead 260, sprocket wheel 255, contact arm 256, contact 271, wire 272, relay coil 273, and lead 274. Thus, relay coil 273 is energized and attracts switch 275 into closed position for completing the load circuit 276 and operating the load 277. When the time delay circuit 259, comprising a condenser 278, a resistor 279 and a rectifier 279*a* in series, passes current to the relay coil 260*a*, the dog 280 will be attracted and will release its engagement with the teeth of sprocket wheel 255. The sprocket wheel will then be turned to its original position under the urging of spiral spring 281. While this deenergizes relay 273, switch 275 is mechanically latched in closed position so that the load circuit 276 is not disturbed by the resetting of the stepping relay.

In order to open the load circuit, it is necessary to step the contact arm five positions to contact 282. This will close the circuit through lead 260, sprocket wheel 255, contact arm 256, contact 282, wire 283, relay coil 284, and lead 274. Thus, it is seen that the relay coil 284 will be energized and retract the switch 275 from its closed position. Thus, the load circuit will be open and, after a predetermined time interval, dog 280 will be retracted from engagement with sprocket wheel 255 and the contact arm 256 will return to its original position.

In view of the foregoing, it is seen that a radio control operation device is provided which is operable in response to interruption in a signal. Therefore, as there is no operation when the signal is present, unauthorized personnel cannot effect operation by producing the signal.

It is now apparent that the present invention provides a method and apparatus which accomplishes the intended objects, and which is adapted to meet practical conditions of use.

While this specification sets forth in detail the present and preferred apparatus and method, still in practice deviations from such detail may be resorted to as do not form a departure from the spirit of the present invention as defined by the following claims.

Having thus described our invention, we claim as new and desire to secure by Letters Patent:

1. In combination, an electric load, a circuit for said load, means to close said circuit including a switch, means to close said switch, said means comprising a relay, a normally closed switch to control said relay, electro-magnetic means to open said normally closed switch when said electro-magnetic means is energized, radio receiving means to retain said electro-magnetic means energized while said receiving means is receiving a radio frequency carrier current, whereby interruptions of the carrier current to the radio receiving means will alternately de-energize and energize said electro-magnetic means to permit said normally closed switch to alternately close and open, and means controlled by a predetermined number of said switch closures and openings to complete the circuit for said relay.

2. A system for the control of an electric load, comprising a radio broadcasting station, broadcasting at continuous predetermined carrier frequency, clock means, means controlled by the clock means to interrupt the emission of carrier current from said broadcasting station, a predetermined number of times within a predetermined period, a radio receiving station tuned to said carrier frequency, a relay including a normally closed switch, and means to energize the relay to open the switch while the radio receiving station is receiving carrier current from said broadcasting station, an electric load, a circuit for said load, a switch in said circuit, and means controlled by the closing of said normally closed switch said predetermined number of times within said predetermined period, to actuate the switch in the load circuit.

3. In combination, means to receive a radio carrier current, means to amplify the voltage corresponding to said carrier current, means to amplify the power of the voltage amplified carrier current, a normally closed switch, means controlled by the power amplified carrier current to retain the normally closed switch open when the radio receiving means is receiving a carrier current, an electric load, and means controlled by the closing of the normally closed switch a predetermined number of times within a predetermined period of time due to interruptions of the carrier current received by the radio receiving means, to energize said load, means to de-energize the energized load upon closing the normally closed switch another predetermined number of times within said predetermined period due to interruptions in the signal received by the signal receiving means, said load energizing and load de-energizing means comprising a stepping relay controlled by the normally closed switch, a switch controlling the load, and means controlled by the stepping relay to close said load switch when the normally closed switch is closed the first predetermined number of times within said period and to open said load switch upon the normally closed switch closing the second predetermined number of times within said period.

4. In combination, a radio receiving means comprising a tuned antenna circuit, electronic means to amplify the voltage of the radio frequency carrier current received by the tuned antenna circuit, electronic means to amplify the power of the voltage amplified carrier current, a switching assembly comprising a relay adapted to be energized by the power amplified carrier current and deenergized when the signal is interrupted, a normally closed switch adapted to be retained in open condition when said relay is energized and to close when the relay is deenergized due to an interruption in the carrier current, a stepping relay controlled by said normally closed switch, an electric circuit, a switch in said circuit, and means controlled by the stepping relay to close the circuit switch when the normally closed switch closes a predetermined number of times within a predetermined interval as a result of a similar pattern of interruptions in the carrier current in combination with time delay means to return the stepping relay to normal condition if the number of interruptions in the carrier current are less than the required number within said interval.

5. In combination, a radio receiving means comprising a tuned antenna circuit, electronic means to amplify the voltage of the radio frequency carrier current received by the tuned antenna circuit, electronic means to amplify the power of the voltage amplified carrier current, a switching assembly comprising a relay adapted to be energized by the power amplified carrier current and deenergized when the carrier current is interrupted, a normally closed switch adapted to be retained in open condition when said relay is energized and to close when the relay is deenergized due to an interruption in the carrier current, a stepping relay controlled by said normally closed switch, an electric circuit, a switch in said circuit, and means controlled by the stepping relay to close the circuit switch when the normally closed switch closes a predetermined number of times within a predetermined interval as a result of a similar pattern of interruptions in the carrier current, and for opening said circuit switch upon said normally closed switch closing another switch a predetermined number of times within said predetermined interval, in combination with time delay means to return the stepping relay to normal condition, should the number of interruptions in said carrier current be less than required within said time interval for opening or closing said circuit.

6. In combination, a radio receiving means comprising a tuned antenna circuit, electronic power means to amplify the voltage of the carrier current received by the tuned antenna circuit, saturable reactor means to amplify the power of the voltage amplified carrier current, a switching assembly comprising a relay adapted to be energized by the power amplified carrier current, a normally closed switch adapted to be retained in open condition when said relay is energized, a stepping relay controlled by said normally closed switch, an electric circuit, a switch in said circuit, and means controlled by the stepping relay to close the circuit switch when the normally closed switch closes a predetermined number of times within a predetermined interval.

7. In combination, a radio circuit comprising an antenna, means to tune the antenna to a predetermined carrier current frequency, an electronic first stage amplifier for the tuned carrier current, an electronic second stage amplifier connected to the first stage amplifier, an electronic third stage amplifier connected to said second stage amplifier, a rectifier interposed between the second and third stage amplifiers, a relay controlled by the plate circuit of the third stage amplifier, a normally closed switch controlled by said relay, a stepping relay controlled by said normally closed switch, an electric circuit, means controlled by the stepping relay to control said electric circuit, and time delay means to control said stepping relay.

References Cited in the file of this patent

UNITED STATES PATENTS

| | | |
|---|---|---|
| 1,702,423 | Wensley | Feb. 19, 1929 |
| 2,014,011 | Whitby et al. | Sept. 10, 1935 |
| 2,203,358 | Koenig | June 4, 1940 |
| 2,457,730 | Roberts | Dec. 28, 1948 |
| 2,462,343 | Wohlgemuth | Feb. 22, 1949 |
| 2,574,458 | Atkinson et al. | Nov. 13, 1951 |
| 2,578,347 | Gagnaire | Dec. 11, 1951 |
| 2,655,606 | Trimble | Oct. 13, 1953 |

FOREIGN PATENTS

| | | |
|---|---|---|
| 374,880 | Italy | Sept. 14, 1939 |

OTHER REFERENCES

"Electronics," March 1943, pp. 315–316.